VARIABLE ATTENUATOR

Filed May 24, 1961 2 Sheets-Sheet 1

INVENTOR.
GLYN BOSTICK
BY
James P. Malone

*INVENTOR.*
GLYN BOSTICK
*BY* James C. Malone 3,192,493
Patented June 29, 1965

3,192,493
VARIABLE ATTENUATOR

Glyn Bostick, Syracuse, N.Y., assignor to Radar Design Corporation, Syracuse, N.Y.

Filed May 24, 1961, Ser. No. 112,298
4 Claims. (Cl. 333—81)

This invention relates to variable attenuators for electrical signals, and more particularly to attenuators having input resistance substantially equal to output resistance at all settings and having direct reading of attenuation wherein the value of attenuation does not appreciably change over large frequency changes.

More particularly the invention relates to the direct reading variable attenuator of the T-pad type having a frequency range of zero to 500 plus mc., i.e., the device is operable from D.C. to microwave frequencies.

In conventional T-pad attenuators, assuming a fixed resistance value for the load the three circuit resistors are simultaneously adjusted in value to make the input-output power an arbitrary ration (preferably between unity and infinity) in such manner that the input resistance is also equal to the load resistor.

At D.C. such a device is feasible using commonly available adjustable potentiometers mutually coupled by a proper mechanical linkage, to obtain synchronism between resistor changes.

Above a few kilocycles, wire wound resistor, the more common type, introduce appreciable inductances preventing the two desired conditions: namely, input resistance remaining equal to the load resistance through all values of adjustment and input-output power ratio approaching desired high values.

At microwave frequencies, say at 1000 mc. and above, attenuating plastics are frequently introduced into the field of a coaxial line to cause attenuation. Since such attenuation will depend upon the volume of the loosy material introduced into the field, it is obvious that variable attenuators of this type are feasible.

Such attenuators, however, are not useful at D.C. since, invariably, there must be variation in the field, that is alternating current, for there to be any loss.

Also, in the low-frequencies in the vicinity of D.C., this type of attenuator is quite inefficient.

In addition, the aforementioned type of attenuator had the following undesirable characteristics: For a given mechanical position, attenuation is proportional to frequency whereas, it is generally desired that a given mechanical setting provide a constant amount of attenuation regardless of frequencies.

The present approach to the problem uses the T-pad arrangement but uses microwave type resistors and a simple mechanical actuation to obtain the desired characteristics.

This technique, therefore, makes possible a direct reading attenuator for the applicable ranges, from D.C. to microwave frequencies. Therefore, the present invention is a variable attenuator of the T-pad style wherein the resistors used are of the microwave type and a mechanical actuator is provided to obtain the two desired characteristics, namely:

(1) Input resistance equals output resistance, and (2) Value of attenuation does not appreciably change. i.e., may be calibrated, over-large frequency ranges.

The present invention generally comprises a substantially flat hollow metal casing, a plate of insulating material slidably mounted in said casing, calibrated knob means connected to move said plate, said plate having input and output resistances printed or otherwise deposited thereon, said input and output resistances being connected to ground at their junction through a shunt resistance, input and output connection brushes adapted to make contact with the input and output resistances and a grounded brush adapted to make contact with said shut resistance, said shunt resistance having a triangular shape, said resistances being adapted to maintain a predetermined input to output resistance radio and variable attenuation as said plate is moved relative said brushes.

Accordingly, a principal object of the invention is to provide new and improved direct reading variable attenuator means.

Another object of the invention is to provide new and improved direct reading variable attenuator means of the T-pad type.

Another object of the invention is to provide new and improved direct reading variable attenuator means wherein the input resistance equals the output resistance at all positions.

Another object of the invention is to provide new and improved direct reading variable attenuator means wherein the input resistance equals the output resistance at all positions and said attenuator is substantially insensitive to frequency changes over a predetermined range.

Another object of the invention is to provide a direct reading variable attenuator comprising a plate of insulating material slidably mounted in a casing, calibrated knob means adapted to move said plate, input and output resistances mounted on said plate, a shunt resistance mounted on said plate conecting said input and output resistances to ground, input and output brush contact means mounted on the casing and adapted to contact the input and output resistances respectively, a ground brush mounted on the casing and adapted to contact the shunt resistances, the resistances being shaped and sized to maintain a predetermined input to output resistance ratio and calibrated attenuation as said plate is moved relative said brushes.

These and other objects of the invention will be apparent from the following specification and drawings, of which—

FIG. 4 is a bottom plan view of the embodiment of FIG. 1 with the bottom removed;

FIG. 5 is a sectional view along the line 5—5 of FIG. 4 with the bottom on.

Figure 3:
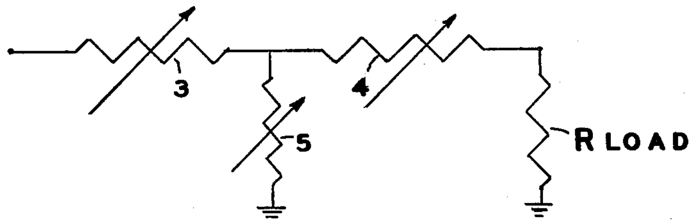
FIG. 3 is a schematic electrical diagram of the embodiment of the invention.

Referring to the figures the invention generally comprises a substantially flat split casing 1 for instance of cast aluminum. A plate 2 of insulating material slidably mounted in the casing has printed or otherwise deposited thereon an input resistance 3, an output resistance 4, and a shunt resistance 5 which has a triangular shape and which is connected to the input and output resistances, by conductor strip 9 forming a T-pad shown schematically in FIG. 3.

Figure 1:
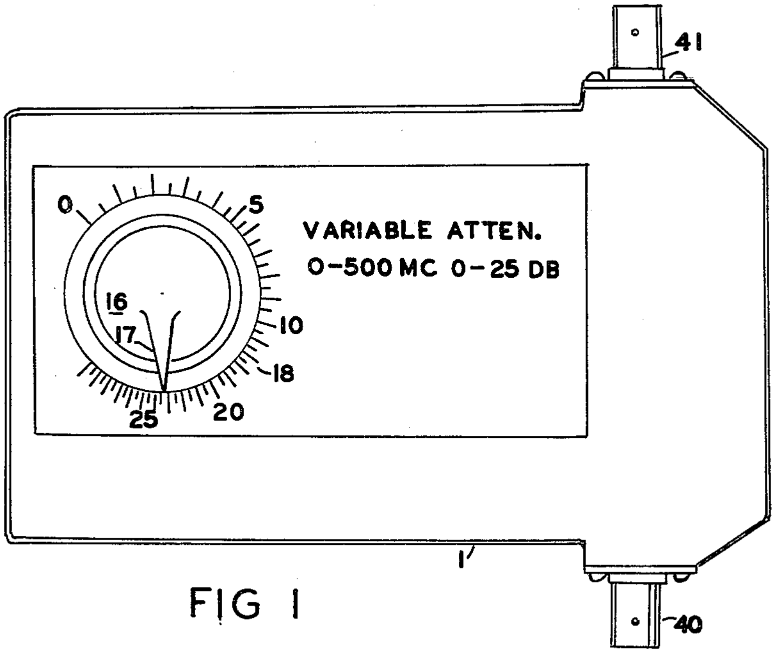
FIG. 1 is a plan view of an embodiment of the invention.
Figure 2:
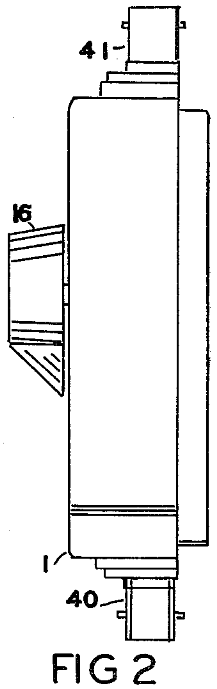
FIG. 2 is a side view of the embodiment of FIG. 1.

The plate 2 is slidably mounted in the casing 1 by means of guides 10, 11, 12 and 13. The plate 2 is adapted to be slidably moved along the long axis of the casing by means of the rack 14 which is geared to shaft 15 which is operated by the knob 16. As illustrated in FIG. 1 the knob 16 has an indexing pointer 17 which may be read on the zero to 25 db scale 18. The rack 14 is mounted in a corresponding slot in the spring loaded bracket 20, mounted on the casing.

The input and output terminals 40 and 41 may be conventional coaxial connectors. The input connection to the input resistance 3 is made by means of a brush contact 21 and the output connection to the output resistance 4 made by means of a brush contact 22. The brushes are mounted on brackets 21' and 22'. A brush 23 is mounted on and grounded to the casing 1 and adapted to contact the triangular shunt resistance 5.

Figure 6:
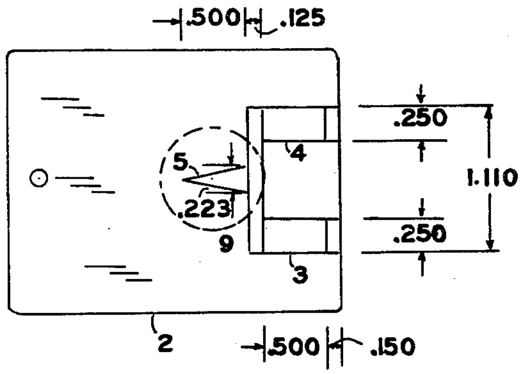
FIG. 6 is a detail view of typical resistance elements of proper proportions mounted on the slidable plate.
Figure 7:
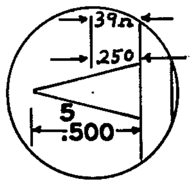
FIG. 7 is an enlarged detail view of a typical shunt resistance element.

FIGS. 6 and 7 show detail views of the slidable plate 2. The resistances 3, 4 and 5 are printed or vaporplated or evaporated onto the glass through masks, or otherwise deposited on the insulating plate 2 in very thin films having small cross-section transverse to current flow for instance, 50 millionths of an inch. The materials used may be of metal such as Nichrome or platinum and, since they are deposited on the plate as a very thin film compared to skin depth at the applicable frequencies, they maintain essentially their D.C. values throughout their range of interest.

While exact size and shape of the resistive elements is of little importance at very low frequency (in the order of a few kc.), the exact shape and relationship of these resistors, is extremely important at microwave frequencies for the physical size of the elements are themselves electrical parameters.

For example, if at high frequencies one wishes to make a embodiment in a 50 ohm system, then the width of his resistive elements in relation to plate spacing, is just as important as the exact values of the resistors.

Resistors 3, 4, and 5 form the legs of a conventional T-pad.

The maintaining of accurate operation of the present attenuator as frequency is increased from D.C. is dependent upon these resistors maintaining their D.C. behavior, namely:

*Condition 1.*—Maintaining ohms per square area constant.

*Condition 2.*—Behaving as "lumped constants" i.e. as if they had zero electrical length (and therefore introduced no phase delay in currents flowing through them).

As frequency is increased, behavior of the resistors depart, progressively from conditions 1 and 2 above—for a given specific dimensional arrangement such as shown.

*Departure from condition 1*

Resistors depart from condition 1 (change ohms per square as frequency is increased) because, as frequency increases the more densely is current concentrated in the outside skins of the resistance film. Since current occupies less than the total available cross-section (normal to current flow) resistance is increased (on a per length basis).

This change can be made negligible (from D.C. to any specified high frequency) by making the film thickness less than skin depth—the average current penetration depth peculiar to given metal at a given frequency.

For example: Resistors are available in the industry which change resistance per square less than 3% from D.C. to 10,000 mc. These resistors are Nichrome evaporated on glass having film thickness approximately 50 millionths inch—much less than skin depth for Nichrome at 10,000 mc. See Transmission Line Theory, King, McGraw-Hill, page 361.

Therefore, practical means are available for rendering ohms/square change negligible—and therefore its affect on instrument operation.

*Departure from condition 2*

As frequency is increased from D.C., the electrical length of any resistor (in fractions of a wavelength, or electrical degrees) becomes finite, introducing a phase delay between the terminals of the resistor.

This phase delay causes the resistor to depart from a pure resistance and to assume a reactive value effectively in series (or shunt) with the original resistance value.

This causes, at a given attenuator setting, the attenuation value to change and the input impedance to differ from output impedance as frequency increases.

This error can be rendered negligibly small, for any specified frequency range, by scaling the resistors down in size so that the reactive error is as small as desired.

It is shown elsewhere. Transmission Line Theory, King, McGraw-Hill, page 363 that the reactive component of a (film) resistor does not exceed approximately 5% for instance, if its length does not exceed 36 electrical degrees.

In the present case (where the example resistors are .500" long) appreciable reactance error does not appear until wavelength decreases to $$0.5'' \times \frac{360^\circ}{36.0^\circ} = 5'' \text{ (2150 mc.)}$$

Since resistors shorter than .125" are being evaporated in the industry then the onset of this extent of reactive effect can be delayed until frequency approaches, say, 10,000 mc., for example.

Therefore, the difference between resistor behavior at high—as against low frequency is associated with dimensions increasing (as fractions of operating wavelength) as frequency is raised.

Given a desired upper limit frequency, a resistor can be scaled downward (so as to decrease the ratio of physical dimensions to wavelength at the upper frequency) to render the operating difference (between said frequency and D.C.) negligible.

With present industrial techniques, such scaling is possible and practical to allow upper frequencies to approximately 10,000 mc. (Operation has been proved in practical modes to 1000 mc.).

This limit is not inherent. Work done to date has not exhausted the potential of currently available resistor techniques.

The shunt resistance 5 has a triangular shape to provide the desired variable attenuation. The input and output resistors 3 and 4 have shape identical to one another so that they will remain equal at all settings.

The shape of the short resistor 5 is a key element in the resistor network.

To fulfill one of the key requirements, namely, that the input resistance equal the load resistance at all positions of the slidable circuit (FIG. 6) with respect to the contacts 23, 21 and 22 the resistance value as measured from the terminal 9, to ground (the case) must have a required value for any specific positon of the slider.

By way of illustration, assume a 50 ohm system. That is, let the load resistance be 50 ohms. In this case, for any position of the slider, the output resistance must be 50 ohms.

Figures 4, 5:
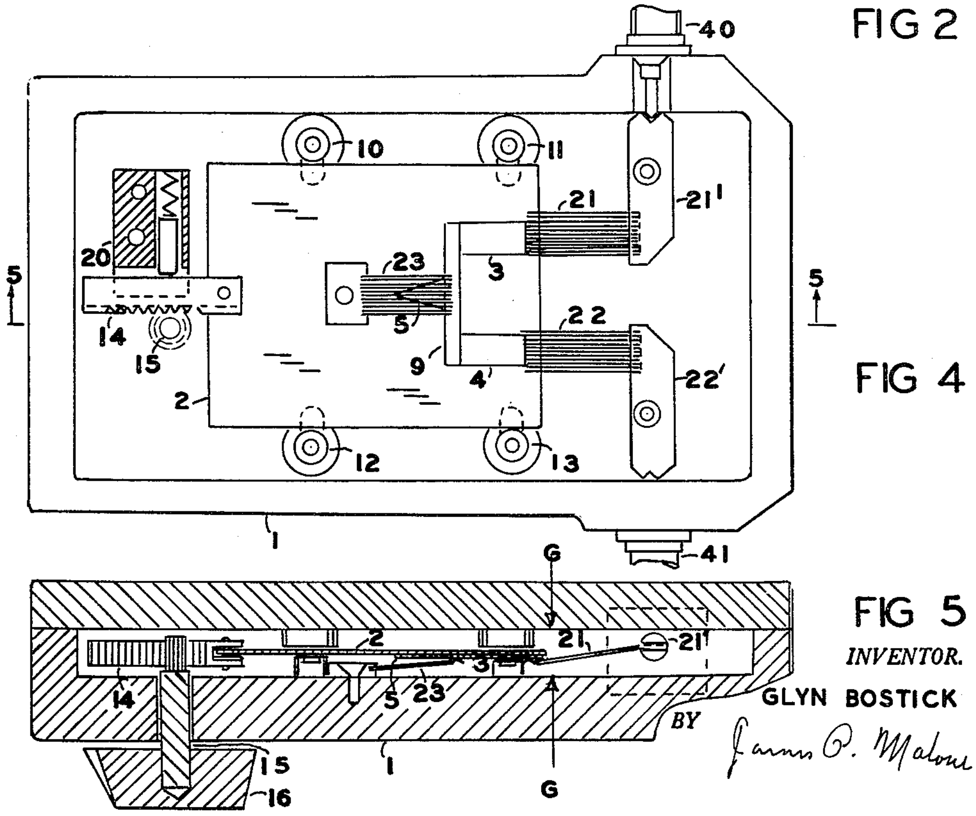

Assume that the sliding circuit is in the position shown in FIG. 4. This is position for maximum attenuation. Note that contact #23 is in contacts with the terminal 9, and that therefore the resistance value from terminal 9 to ground is zero.

Obviously, then, the combination of elements joining the input and output center terminals (for example, the central conductors of the two coaxial conductors) is short-circuited to ground and therefore, theoretically no power should reach the load resistance.

To fulfill the condition that the output resistance should equal the load resistance, resistance #3 must be 50 ohms.

Now, assume the sliding circuit in the other extreme position. That is, with the sliding circuit plate 2 pushed to the right in FIG. 4 to make contact with bars #21' and #22'. In this position, contact #21 and #22 will make contact with terminal 9 and contact #23 will contact the apex of resistor #5.

This is a condition for low attenuation since resistors #3 and #4 are short-circuited and there is a direct metallic connection between the center pins of the two coaxial connectors.

In order for there to be very low attenuation, the resistance from terminal 9 to around must be large (theoretically infinite). It can be shown mathematically that if contact #23 contacts the very apex of resistor #5 the resistance is infinite.

For practical reasons, sliding movement is adjusted such that contact #23 does not contact the point in resistor 5 but some broader width further up the points.

For an intermediate setting of the slider, say at such position that contact #23 contacts resistor #5 at a point midway between the base and the apex and contacts 21 and 22 contact resistors 3 and 4 respectively at the mid-points of these resistors, the resistance value from contact #9 to ground and the resistance values between contacts 9 and contact 22 and between contact 9 and contact 21 must combine in such a way that the output resistance in 50 ohms.

In the case just described, the resistance between contacts 9 and 21 and 9 and 22 will be 25 ohms, and the resistance between contact 9 and ground must be 39 ohms.

If resistors 3, 4 and 5 are laid out to the dimensions shown in FIGS. 6 and 7 (or any scale factor of these dimensions) and if resistors 3, 4 and 5 are produced simultaneously by depositing a conducting film having a value in ohms per square uniform over resistors 3, 4 and 5 and if in addition, the ohms per square in this particular case is 25, then the above requirements will be met for a 50 ohm system, namely, the resistance between contact 9 and 21 or 9 and 22 will be 25 ohms and the resistance from contact 9 to ground will be 39 ohms.

In addition, if slider is then moved to any other position between the first mentioned extremes, the three resistance values will assume such values as to make the output resistance equal to 50 ohms.

The important points are these:

(1) Using the dimensional proportions shown, requiring that the resistive film on all three resistors have the same ohms per square value and requiring that both resistors 3 and 4 be equal to the characteristic impedance of the system (that is, the proper loading resistance) then for any position of the slider the three resistance values will correspond to the three values specified in any standard T-pad table (for example, page 255 of Reference Data for Engineers, I. T. & T. Corp.), for some value of attenuation while maintaining an equality between the load resistor and the output resistance.

In the position shown in FIG. 4 knob 16 is at its maximum db attenuation position and plate 2 at its maximum displacement to the left, the input and output contact brushes 21 and 22 are in series with the input and output resistors 3 and 4 and the shunt resistor 5 is short-circuited by brush 23. Therefore, the resistance from either the input or output terminal to ground is a predetermined amount, for instance, 50 ohms, and theoretically there is no coupling from input to output. Therefore, in this position the input-output ratio is theoretically infinity.

As the plate 2 is moved, by turning the knob 16 toward the connector end of the assembly, more and more of the input and output resistors 3 and 4 will be shorted out, that is, the input and output resistors will become smaller and the resistance from the mid contact area to ground, that is, the shunting resistance, will become larger.

Therefore, this action provides that the input and output resistances remain equal and that the input-output power ratio varies smoothly.

Regarding the triangular resistor: If the base diameter, shown as .223 inch in FIG. 6, is properly chosen with respect to all other resistor dimensions shown, then at any slide position the shunt resistance to ground will be such as to convert a 50 ohm input resistance to a 50 ohm output resistance.

In order that this situation will obtain over a significant portion of the microwave frequency range, the plate spacings above and below the input-output resistors are made so as to maintain a 50 ohm geometrical configuration for example and therefore to maintain low VSWR, in a 50 ohm system, for example.

The type of line being used is commonly called plate-line and in such construction, the various parts of the circuit have some finite coupling to one another. For the particular geometry shown, this coupling was approximately 30 db which set the upper limit of the attenuation.

Various means can be used to reduce this inter-element coupling such as, for example, making resistors narrower and proportionately closing the gap G—G (FIG. 5) between the upper and lower interior plates formed by the casing.

Arbitrarily, larger attenuations can be obtained by enclosing several slidable circuits (FIG. 6) connected in tandem within one cover. We have, for example, produced attenuators in this manner having attenuations in excess of 70 db. It is perfectly feasible to hook enough circuits in tandem to obtain 100 db or any arbitrary amount.

As mentioned previously, the dimensions on the resistor plate are not themselves vital. Their proportions are:

Note that the ohmic value of resistor 3 or 4 must correspond to the desired system impedance. Also, that the conducting film for all three resistors must have the same ohms per square value.

If one were to go to a standard table of T-pad values, once having established that resistors 3 and 4 were going to be straight resistors, and were to assign values for resistors 3 and 4 from zero to characteristic impedance at intervals of say 1/10 the maximum value, and were then to observe the corresponding value required of the shunt resistance (resistance #5), it would be seen that the shunt resistance value required for a corresponding setting of contacts 21 and 22 of resistors 3 and 4 is a logarithmic function of the distance between contact 9 and contacts 21 and 22.

A triangular resistance closely approximates a logarithmic resistor.

The type of transmission line in which this circuit is housed is commonly called plate-line. This consists of an upper and lower plane at the same potential (commonly called ground plane) with the center conductor (or return conductor) of the system suspended midway between these planes.

In the present case, the resistor 3 or 4 constitutes the suspended center conductor. The two blocks creating the gap G correspond to the ground plane system necessary to make the geometric impedance of the system equal to the impedance of resistor 3 or 4.

A complete description of such types of line will be found in Design Data for Radio Engineers previously cited.

The brushes wiping the resistors consist of a large number of very small platinum wires to insure that statistical contact will be kept with the resistor and that the pressure at any point on a resistor will give negligible wear.

Test data shows that impedance match is maintained from 0 frequency through at least 1000 mc. Furthermore, tests show that if a particular attenuation is set up at D.C. there is negligible change in attenuation up through at least 1000 mc.

Many modifications may be made by those who desire to practice the invention without departing from the scope thereof which is defined by the following claims.

I claim:

1. A direct reading variable attenuator parallel plate transmission line comprising a flat hollow metal casing, a plate of insulating material slidably mounted in said casing, calibrated knob means connected to move said plate, said plate having input and output resistance portions each equal to a predetermined characteristic load impedance in series and a triangular center shunt resistance portion, input and output brushes adapted to make contact with said input and output resistance portions and a ground brush mounted in said casing and adapted to make contact with said shunt resistance portion in such manner as to place outside the microwave circuit any unused resistor portion, said resistance portions being shaped and sized to maintain a predetermined input to output resistance ratio and adjustable calibrated attenuation continuously adjustable to zero attenuation, as said plate is moved relative said brushes.

2. A variable attenuator parallel plate transmission line comprising a flat hollow metal casing, a plate of insulating material slidably mounted in said casing, calibrated knob means connected to move said plate, input and output resistances each equal to a predetermined characteristic load impedance and a connecting triangular shunt resistance on said plate, input and output brushes mounted on said casing adapted to make contact with said input and output resistances and a ground brush mounted in said casing and adapted to make contact with said shunt resistance in such manner as to place outside the microwave circuit any unused resistor portion, said resistances being shaped and sized to provide calibrated adjustable attenuation continuously variable to zero attenuation as said plate is moved.

3. A direct reading continuously variable attenuator parallel plate transmission line having a frequency range of 0–1000 mc. comprising a casing, a plate of insulating material slidably mounted in said casing, calibrated knob means connected to move said plate, input and output resistances each equal to a predetermined characteristic load impedance and a connecting triangular shunt resistance on said plate, input and output brushes mounted on said casing adapted to make contact with said input and output resistances and a ground brush mounted in said casing and adapted to make contact with said shunt resistance in such manner as to place outside the microwave circuit any unused resistor portion, said resistance portions being shaped and sized to maintain a predetermined input and output resistance ratio and adjustable calibrated attenuation continuously variable to zero attenuation, as said plate is moved.

4. A direct reading variable attenuator comprising a plate line transmission line including a hollow flat metal casing, a plate of insulating material slidably mounted in said casing, calibrated knob means connected to move said plate, said plate having a T-pad comprising input and output resistances each equal to a predetermined characteristic load impedance in series and a center triangular resistance, input and output brushes adapted to make contact with said input and output resistance portions and a ground brush mounted in said casing and adapted to make contact with said shunt resistance portion, said resistances being shaped and sized to maintain a predetermined input to output resistance ratio and adjustable calibrated attenuation continuously adjustable to zero attenuation, as said plate is moved relative said brushes.

References Cited by the Examiner

UNITED STATES PATENTS

| | | | |
|---|---|---|---|
| 1,872,954 | 8/32 | Hunkins | 333—81 |
| 2,119,195 | 5/38 | Bagno | 333—81 |
| 2,712,584 | 7/55 | Pantagea | 333—81 |
| 2,909,736 | 10/59 | Sommers | 333—84 |
| 2,924,793 | 2/60 | Engelmann et al. | 333—84 |
| 3,002,165 | 9/61 | Ayers | 333—81 |
| 3,014,187 | 12/61 | Sher | 333—81 |
| 3,065,435 | 11/62 | Jones | 333—81 |

HERMAN KARL SAALBACH, *Primary Examiner.*

RUDOLPH V. ROLINEC, *Examiner.*